(12) United States Patent
Ziegler et al.

(10) Patent No.: US 9,229,028 B2
(45) Date of Patent: Jan. 5, 2016

(54) SENSOR FOR LOW FORCE-NOISE DETECTION IN LIQUIDS

(75) Inventors: Dominik Ziegler, Berkeley, CA (US); Paul Ashby, Alameda, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 14/342,758

(22) PCT Filed: Aug. 21, 2012

(86) PCT No.: PCT/US2012/051764
§ 371 (c)(1),
(2), (4) Date: Apr. 16, 2014

(87) PCT Pub. No.: WO2013/036377
PCT Pub. Date: Mar. 14, 2013

(65) Prior Publication Data

US 2014/0250553 A1 Sep. 4, 2014

Related U.S. Application Data

(60) Provisional application No. 61/532,507, filed on Sep. 8, 2011.

(51) Int. Cl.
*G01Q 70/08* (2010.01)
*B82Y 35/00* (2011.01)
*G01Q 30/14* (2010.01)
*G01Q 20/02* (2010.01)
*G01Q 20/04* (2010.01)

(52) U.S. Cl.
CPC ................ *G01Q 70/08* (2013.01); *B82Y 35/00* (2013.01); *G01Q 30/14* (2013.01); *G01Q 20/02* (2013.01); *G01Q 20/04* (2013.01)

(58) Field of Classification Search
USPC ...................................... 850/52, 56
See application file for complete search history.

(56) References Cited

U.S. PATENT DOCUMENTS

| | | |
|---|---|---|
| 4,020,443 A | 4/1977 | LeRoy et al. |
| 5,166,520 A | 11/1992 | Prater et al. |
| 5,653,939 A | 8/1997 | Hollis et al. |
| 5,707,343 A | 1/1998 | O'Hara et al. |
| 6,245,204 B1 | 6/2001 | Lindsay et al. |
| 6,841,792 B2 | 1/2005 | Bynum et al. |

(Continued)

FOREIGN PATENT DOCUMENTS

| | | |
|---|---|---|
| WO | 0194877 A1 | 12/2001 |
| WO | 2004102582 A1 | 11/2004 |

OTHER PUBLICATIONS

International Search Report and Written Opinion on PCT Patent Application No. PCT/US2012/051764, filed on Aug. 21, 2012, 4 pages.

(Continued)

*Primary Examiner* — Nicole Ippolito
*Assistant Examiner* — Hanway Chang
(74) *Attorney, Agent, or Firm* — Lowenstein Sandler LLP

(57) ABSTRACT

The embodiments described herein provide a sensor. In an exemplary embodiment, the sensor includes (1) a resonator, (2) a probe attached to the resonator, and (3) an encasement that encases the resonator, where the encasement includes an opening through which the probe can protrude and where the dimensions of the encasement are on the same order as the dimensions of the resonator.

23 Claims, 11 Drawing Sheets

(56) References Cited

U.S. PATENT DOCUMENTS

| | | |
|---|---|---|
| 7,385,267 B2 | 6/2008 | Lieber et al. |
| 2002/0084791 A1 | 7/2002 | Klehn et al. |
| 2002/0092982 A1 | 7/2002 | Jhe et al. |
| 2003/0030449 A1 | 2/2003 | Moreland et al. |
| 2004/0196198 A1 | 10/2004 | Aisenbrey |
| 2005/0140288 A1 | 6/2005 | Suzuki |
| 2005/0150280 A1 | 7/2005 | Tang et al. |
| 2005/0165301 A1 | 7/2005 | Smith et al. |
| 2005/0241392 A1 | 11/2005 | Lyubchenko |
| 2006/0155478 A1 | 7/2006 | Roukes et al. |
| 2008/0036464 A1 | 2/2008 | Steeples et al. |
| 2008/0216583 A1 | 9/2008 | Bargatin et al. |
| 2009/0100657 A1 | 4/2009 | Aigner |
| 2010/0064395 A1 | 3/2010 | Clark |
| 2010/0132075 A1 | 5/2010 | Iyoki et al. |
| 2010/0148813 A1 | 6/2010 | Erickson |
| 2010/0229265 A1* | 9/2010 | Jin et al. .......................... 850/60 |
| 2011/0001394 A1 | 1/2011 | Dalla Piazza et al. |
| 2011/0041224 A1 | 2/2011 | Raman et al. |
| 2011/0193055 A1 | 8/2011 | Samuelson et al. |
| 2012/0324608 A1 | 12/2012 | Rychen |

OTHER PUBLICATIONS

Binnig, G. et al. (Mar. 3, 1986). "Atomic Force Microscope", Physical Review Letters 56(9):930-934.

Martin, Y. et al. (May 18, 1987). "Magnetic Imaging by "Force Microscopy" with 1000 A Resolution". Applied Physics Letters 50(20):1455-1457.

Cho, W.J. et al. (May 4, 2005). "Size of Supramolecular SNARE Complex: Membrane-Directed Self-Assembly" JACS Communications 127:10156-10157.

Noy, A. et al. (1997). "Chemical Force Microscopy". Ann. Rev. Mater. Sci. 27:381-421.

Ziegler, E. et a. (2011). "Force Gradient Sensitive Detection in Lift-Mode Kelvin Probe Force Microscopy". Nanotechnology 22:1-9.

Walters, D.A. (Oct. 1996). "Short Cantilevers for Atomic Force Microscopy". Rev. Sci. Instrum. 67(10):3583-3590.

Hansma, P.K. (Oct. 14, 1988). "Scanning Tunneling Microscopy and Atomic Force Microscopy: Application to Biology and Technology". Science 242:209-216.

Hansma, H.G. et al. (1994). "Biomolecular Imaging with the Atomic Force Microscope". Ann. Rev. Biophys. Biomol. Struct. 23:115-139.

Fritz,J. (2008). "Cantilever Biosensors". The Royal Society of Chemistry Analyst 133:855-863.

Arlett, J.L. et al. (Apr. 2011). "Comparative Advantages of Mechanical Biosensors". Nature Nanotechnology 6:203-215.

Boisen, A. et al. (2011). "Cantilever-like Micromechanical Sensors" Reports of Progress in Physics 74:1-30.

Butt, H-J. et al. (1995). "Calculation of Thermal Noise in Atomic Force Microscopy". Nanotechnology 6:1-7.

Sader, J.E. (Jul. 1, 1998). "Frequency Response of Cantilever Beams Immersed in Viscous Fluids with Applications to the Atomic force Microscope". Journal of Applied Physics 84(1):64-76.

Sanii, B. et al. (2010). "High Sensitivity Deflection Detection of Nanowires". Physical Review Letters 104:147203-1-147203-4.

Schaffer, T.E. et al. (downloaded 2014). "An Atomic Force Microscopy for Small Cnatilevers". SPIE 3009:48-52.

Torbrugge, S. et al. (2010) "Application of the KolibriSensor to Combined Atomic-resolution Scanning Tunneling Microscopy and Noncontact Atomic-force microscopy Imaging." Journal of Vacuum Science & Technolgoy 28(3):C4E12-C4E20.

van Zanten, T.S. et al. (2010). "Imaging Indivival Proteins and Nanodomains on Intact Cell membranes with a Probe-Based Optical Antenna" Wiley Interscience 6(2):270-275.

Ledue, J.M. et al. (2009). "High Q Optical Fiber Tips for NC-AFM in Liquid." Nanotechnology 20:1-6.

Ziegler, D. et al. (Jan. 2014). "Encased Cantilevers for Low-noise Force and Mass Sensing in Liquids." 128-131.

European Search Report for EP Application No. 12829889.0, mailed Mar. 16, 2015, 7 pages.

* cited by examiner

SENSOR FOR LOW FORCE-NOISE DETECTION IN LIQUIDS

RELATED APPLICATIONS

This application is a US National Stage 371 Application of PCT application No.: PCT/US2012/051764, filed Aug. 21, 2012, which claims priority to U.S. Provisional Patent Application Ser. No. 61/532,507, filed Sep. 8, 2011, which are hereby incorporated by reference in their entirety.

STATEMENT OF GOVERNMENT SUPPORT

This invention was made with government support under Contract No DE-AC02-05CH11231 awarded by the U.S. Department of Energy. The government has certain rights in this invention.

FIELD

Embodiments described herein relate to the field of cantilevers, and particularly relate to a sensor for low-noise three detection in liquids.

BACKGROUND

Microelectrical mechanical systems (MEMS) have become commonplace in many technologies due to their exquisite performance as sensors. MEMS devices, or more specifically mechanical resonators, can be used to measure acceleration, changes in mass, viscosity of their environment, or the stiffness of their interaction with a substrate. Reducing the intrinsic noise of the sensor increases sensitivity for any type of measurement.

DETAILED DESCRIPTION

This application specifically references Atomic Force Microscopy (AFM) because it is one intended application of the embodiments described herein, but some embodiments may work well for other MIEMS sensor applications.

Figure 1:
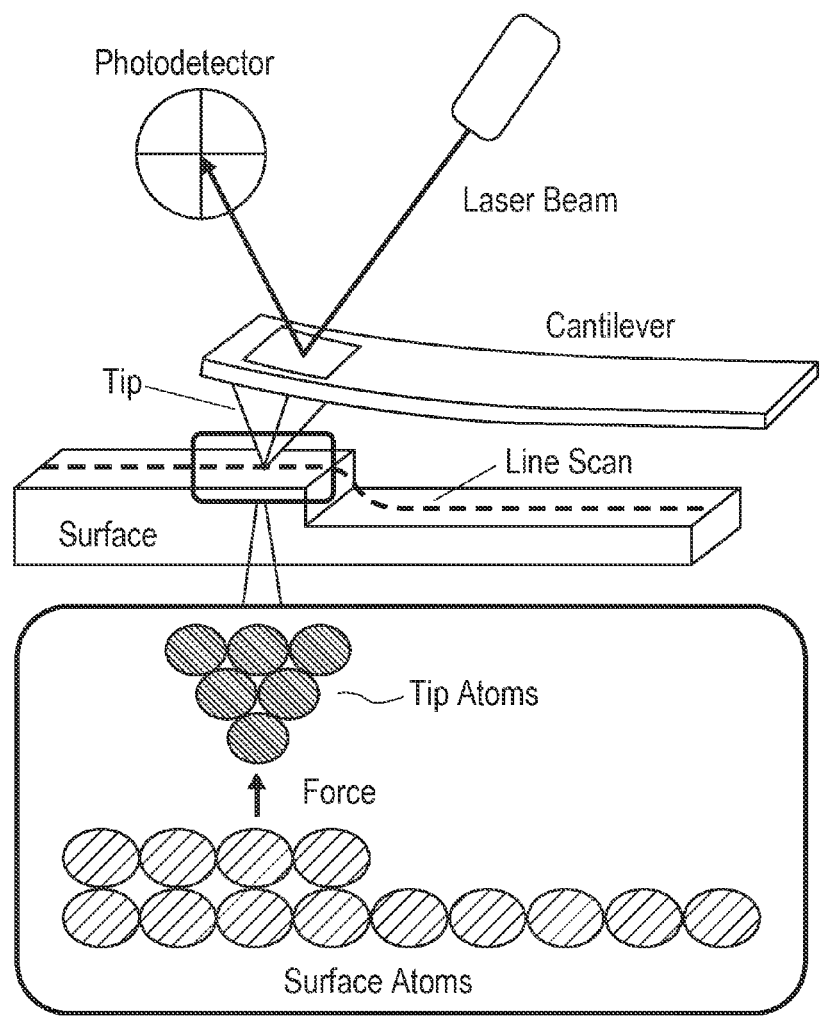
FIG. 1 shows an example of the operation of an AFM.

FIG. 1 shows an example of the operation of an AFM. An AFM measures interfacial material properties topography, magnetism, specific chemical interactions, etc.) with high spatial resolution by sensing the force the surface applies to a very sharp probe. The sharp probe is attached at the end of a spring (typically a rectangular cantilever), which deflects when a force is applied to the tip. Using an AFM to measure the surface of soft materials such as living cells has been elusive, however, because the minimum force required by the instrument may be enough to deform the soft material, reducing the resolution and possibly causing damage.

The minimum detectable force is associated with losses due to damping of the resonator. When the surrounding fluid is either air at greater than 1 torr of pressure or a liquid, the dominant tosses are due to viscous damping. In an aqueous solution, the acceleration of the increased fluid mass significantly lowers the resonance frequency, and the high viscosity of water increases damping. Compared to measurements in air, the force sensitivity of the same cantilever is decreased by more than one order of magnitude. Researchers have been attempting to decrease viscous damping by reducing the size of the cantilever. Similarly, working with small high frequency cantilevers enables high speed AFM for monitoring dynamic processes. However, as the common detection mechanism requires reflection of a laser beam, the cantilever's size needs to be greater than the diffraction limit of light for optimum sensitivity. A new detection method, which overcomes this problem and as a consequence allows using smaller cantilevers or even nanowires, is discussed in International Application No. PCT/US2010/23407, filed Feb. 5, 2010, which is herein incorporated by reference.

Another way of reducing damping would consist of keeping the cantilever dry, such that only a small portion is immersed in the solution for interacting with the substrate. This maintains the low damping of working in air while enabling the force interaction to be performed in solution. Practically, this has been difficult to implement, however. In the few attempts so far, the resonator and their enclosures are so large that the size offsets gains due to lower viscosity (Kolibri™ Sensor by SPECS, Berlin, Germany or tuning fork designs, for example). All these designs demand specialized instrumentation, and cannot be easily applied on standard AFM setups.

The embodiments described herein provide a sensor. The sensor may be used to measure acceleration, changes in mass, viscosity of its environment, or the stiffness of its interaction with a substrate, for example. In an exemplary embodiment, the sensor includes (1) a resonator, (2) a probe attached to the resonator, and (3) an encasement that encases the resonator, where the encasement includes an opening through which the probe can protrude and where the dimensions of the encasement are on the same order as the dimensions of the resonator.

Figure 2:
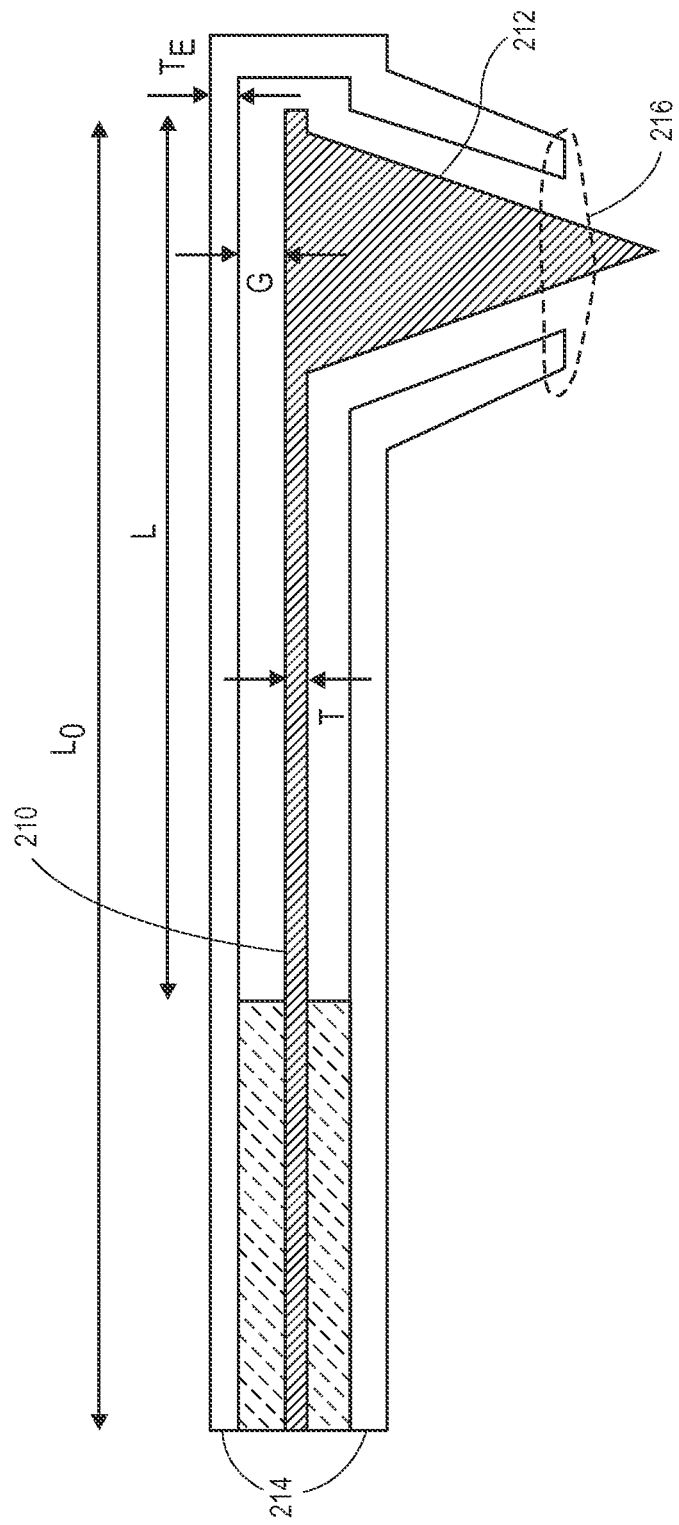
FIG. 2 shows an example of a cross-sectional illustration of a sensor.

Referring to FIG. 2, in an exemplary embodiment, the embodiment includes a resonator 210, (2) a probe 212 attached to resonator 210, and (3) an encasement 214 that encases resonator 210, where encasement 214 includes an opening 216 through which probe 212 can protrude and where the dimensions of encasement 214 are on the same order as the dimensions of resonator 210. Once immersed in a liquid, such as water, surface tension prevents the liquid from entering encasement 214 through opening 216. In some embodiments, the probe may have a hydrophobic coating to aid in preventing water from entering into opening 216.

Cantilever Resonator

Figure 3:
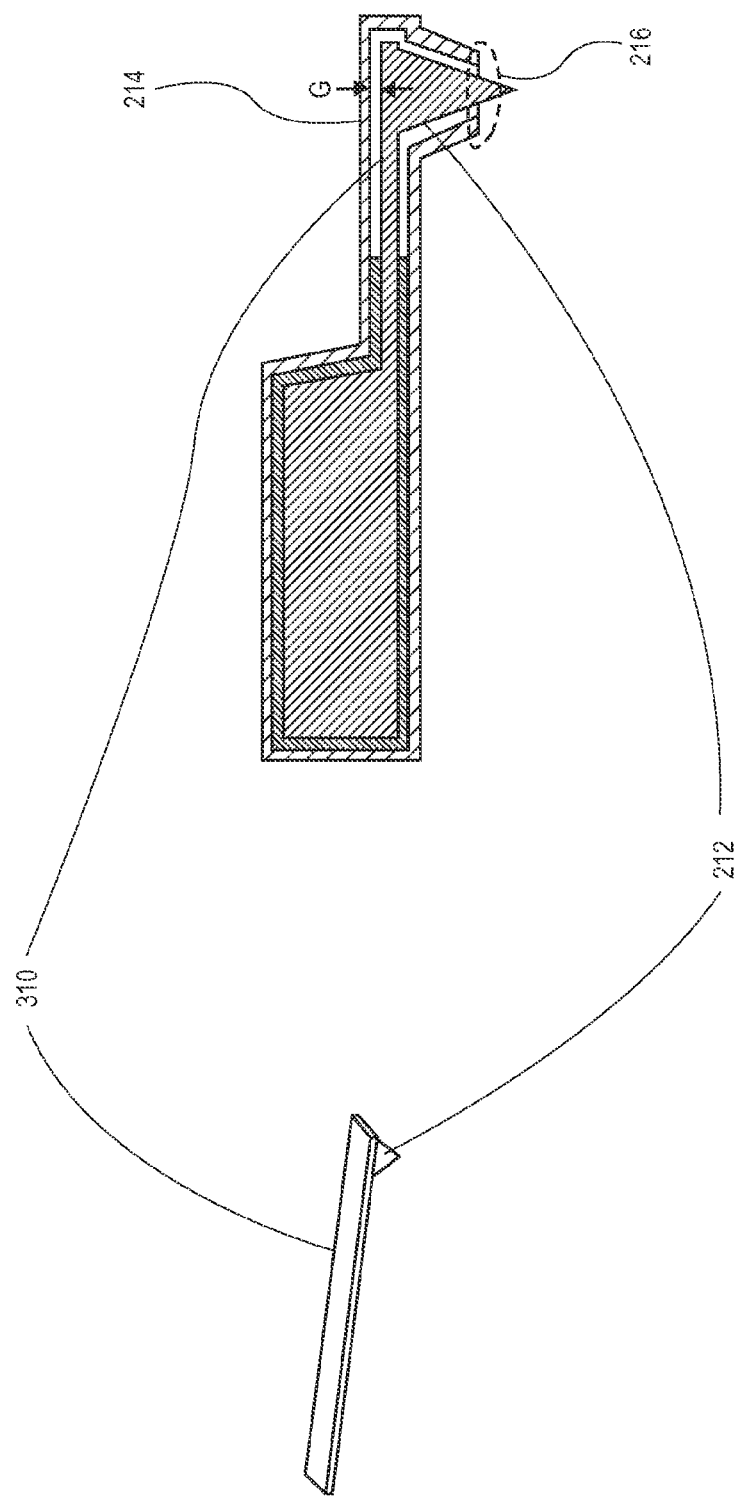
FIG. 3 shows examples of illustrations of a sensor.

Referring to FIG. 3, in an exemplary embodiment, resonator 210 in les a cantilever 310.

Dimensions of Cantilever

Referring to FIG. 2 and FIG. 3, in an exemplary embodiment, the thickness T of resonator 210 and cantilever 310 is between about 10 nm and 20 microns or is between about 100 nm and 20 microns. In an exemplary embodiment, the width of resonator 210 and cantilever 310 is between about 10 nm and 200 microns or is between about 100 nm and 200 microns. Referring to FIG. 2 and FIG. 3, in an exemplary embodiment, the length L of resonator 210 and cantilever 310 is between about 10 nm and 500 microns or is between about 100 nm and 500 microns.

Dimensions of Encasement

Referring to FIG. 2 and FIG. 3, in an exemplary embodiment, the thickness $T_E$ of encasement 214 is between about 10 nm and 20 microns or is between about 100 nm and 20 microns. In an exemplary embodiment, the width of encasement 214 is between about 10 nm and 250 microns or is between about 100 nm and 250 microns. Referring to FIG. 2 and FIG. 3, in an exemplary embodiment, the length $L_0$ of encasement 214 is between about 10 nm and 550 microns or is between about 100 nm and 550 microns. In an exemplary embodiment, the gap G between encasement 214 and resonator 210 is less than about 500 microns or about 10 nm to 500 microns.

Membrane Resonator

Figure 4:
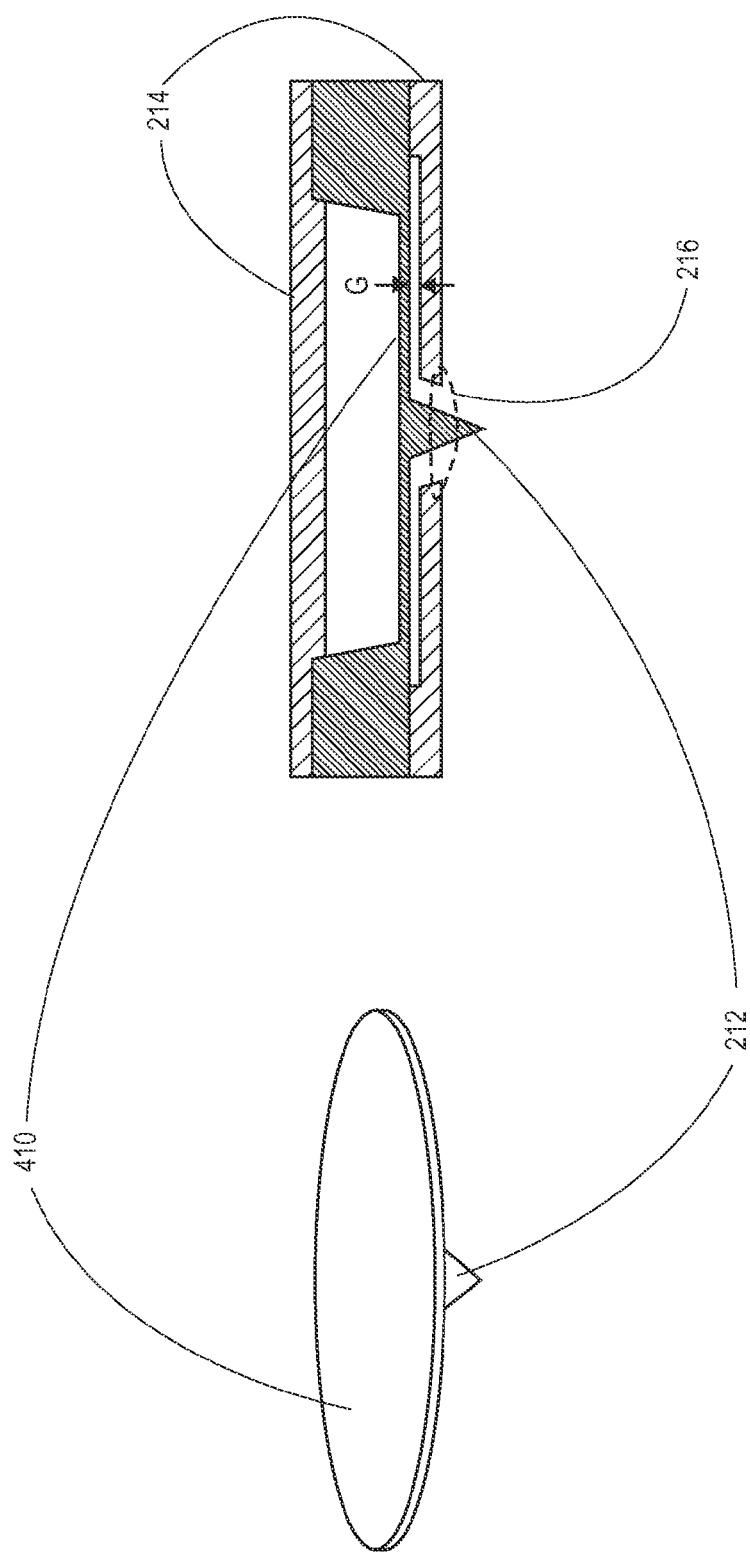
FIG. 4 shows examples of illustrations of a sensor.

Referring to FIG. 4, in an exemplary embodiment, resonator 210 includes a membrane 410.

Dimensions of Membrane

Referring to FIG. 2 and FIG. 4, in an exemplary embodiment, the thickness T of resonator 210 and membrane 410 is between about 10 nm and 20 microns. In an exemplary embodiment, membrane 410 has a circular shape with a radius between about 50 nm and 250 microns. In an exemplary embodiment, membrane 310 has a regular polygon shape with a radius between about 50 nm and 250 microns. In an exemplary embodiment, membrane 410 has a polygon shape with a maximum lateral dimension between about 100 nm and 500 microns.

Dimensions of Encasement

Referring to FIG. 2 and FIG. 4, in an exemplary embodiment, the thickness $T_E$ of encasement 214 is between about 100 nm and 20 microns. In an exemplary embodiment, the maximum lateral dimension of encasement 214 is between about 100 nm and 550 microns. In an exemplary embodiment, the width of encasement 214 is between about 100 nm and 250 microns. In an exemplary embodiment, the gap G between encasement 214 and resonator 410 is less than about 500 microns or about 10 nm to 500 microns.

Suspended Beam Resonator

Figure 5:
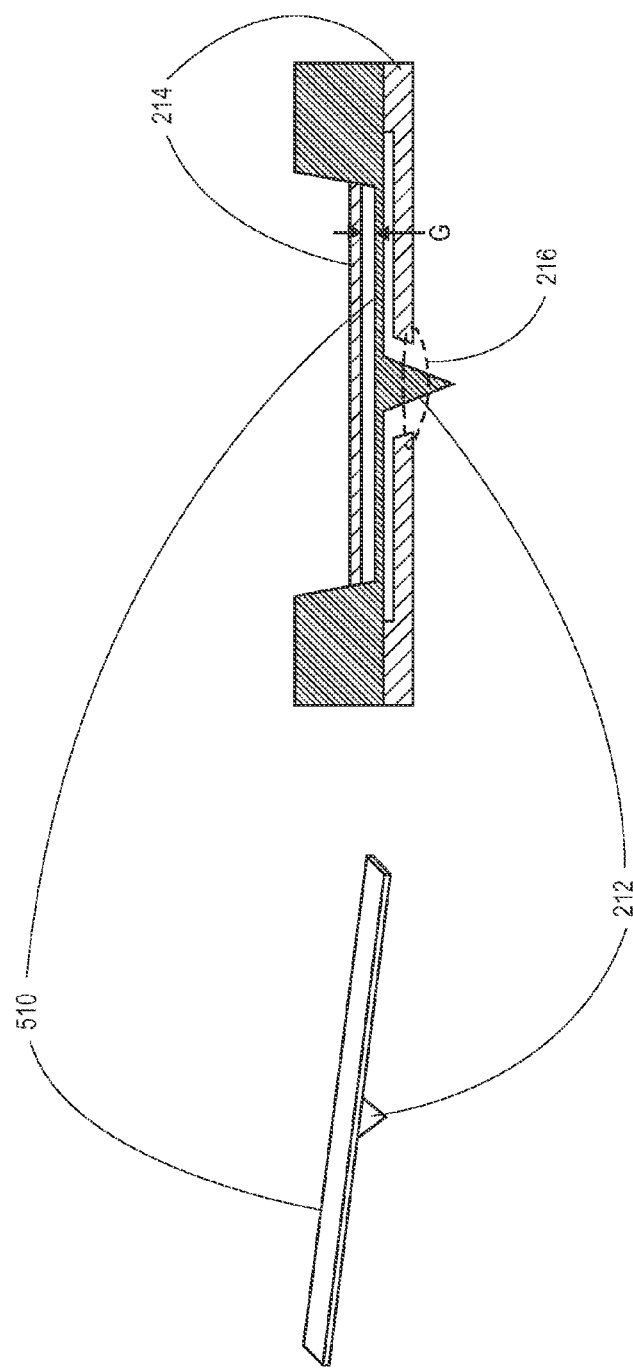
FIG. 5 shows examples of illustrations of a sensor.

Referring to FIG. 5, in an exemplary embodiment, resonator 210 includes a suspended beam 510.

Dimensions of Cantilever

Referring to FIG. 2 and FIG. 5, in an exemplary embodiment, the thickness of resonator 210 and suspended beam 510 is between about 100 nm and 20 microns. In an exemplary embodiment, the width of suspended beam 510 is between about 100 nm and 200 microns. Referring to FIG. 2 and FIG. 5, in an exemplary embodiment, the length L of resonator 210 and suspended beam 510 is between about 100 nm and 500 microns.

Dimensions of Encasement

Referring to FIG. 2 and FIG. 5, in an exemplary embodiment, the thickness $T_E$ of encasement 214 is between about 100 nm and 20 microns. In an exemplary embodiment, the width of encasement 214 is between about 100 nm and 250 microns. Referring to FIG. 2 and FIG. 5, in an exemplary embodiment, the length $L_0$ of encasement 214 is between about 100 nm and 550 microns an exemplary embodiment, the gap G between encasement 214 and resonator 510 is less than about 500 microns or about 10 nm to 500 microns.

Materials for Encasement

In an exemplary embodiment, encasement 214 includes glass. In a particular embodiment, the glass is selected from the group consisting of amorphous silicon nitride, amorphous silicon dioxide, amorphous aluminum oxide, and amorphous zinc oxide.

In an exemplary embodiment, encasement 214 includes plastic. In a particular embodiment, the plastic is selected from the group consisting of polyesters, polyethylene, polyvinyl chloride, polypropylene, polyacrylics, polycellulosics, polycarbonates, polystyrenes, polyamides, polyacetonitriles, polymethlamethacrylate, polyxylylenes, cellulose acetate butyrate, glycol modified polyethylene terphthalate, and styrene butadiene copolymer.

In an exemplary embodiment, encasement 214 includes insulating material. In a particular embodiment, the insulating material is selected from the group consisting of silicon nitride, silicon dioxide, diamond, and aluminum oxide.

In an exemplary embodiment, encasement 214 includes semiconductor material. In a particular embodiment, the semiconductor material is selected from the group consisting of silicon, silicon doped with boron, silicon doped with phosphorus, silicon doped with arsenic, silicon doped with gallium, gallium arsenide, doped diamond, amorphous carbon, zinc oxide, and indium gallium zinc oxide.

In an exemplary embodiment, encasement 214 includes conductive material. In a particular embodiment, the conductive material is selected from the group consisting of amorphous carbon, indium tin oxide (ITO), aluminum zinc oxide (AZO), and indium cadmium oxide.

In an exemplary embodiment, encasement 214 includes metal. In a particular embodiment, the metal is selected from the group consisting of gold, silver, platinum, aluminum, titanium, chromium, titanium nitride, and copper.

Materials for Resonator, Cantilever, Membrane, and Suspended Beam

In an exemplary embodiment, resonator 210, cantilever 310, membrane 410, and suspended beam 510 includes glass. In a particular embodiment, the glass is selected from the group consisting of amorphous silicon nitride, amorphous silicon dioxide, amorphous aluminum oxide, and amorphous zinc oxide.

In an exemplary embodiment, resonator 210, cantilever 310, membrane 410, and suspended beam 510 includes plastic. In a particular embodiment, the plastic is selected from the group consisting of polyesters, polyethylene, polyvinyl chloride, polypropylene, polyacrylics, polycellulosics, polycarbonates, polystyrenes, polyamides, polyacetonitriles, polymethlamethacrylate, polyxylylenes, cellulose acetate butyrate, glycol modified polyethylene terphthalate, and styrene butadiene copolymer.

In an exemplary embodiment, resonator 210, cantilever 310, membrane 410, and suspended beam 510 includes insulating material. In a particular embodiment, the insulating material is selected from the group consisting of silicon nitride, silicon dioxide, diamond, and aluminum oxide.

In an exemplary embodiment, resonator 210, cantilever 310, membrane 410, and suspended beam 510 includes semiconductor material. In a particular embodiment, the semiconductor material is selected from the group consisting of silicon, silicon doped with boron, silicon doped with phosphorus, silicon doped with arsenic, silicon doped with gallium, gallium arsenide, doped diamond, amorphous carbon, zinc oxide, and indium gallium zinc oxide.

In an exemplary embodiment, resonator 210, cantilever 310, membrane 410, and suspended beam 510 includes piezoelectric material. In a particular embodiment, the piezoelectric material is selected from the group consisting of lead zirconate titanate (PZT), quartz, and lead titanate.

In an exemplary embodiment, resonator 210, cantilever 310, membrane 410, and suspended beam 510 includes piezoresistive material. In a particular embodiment, the piezoresistive material is selected from the group consisting of silicon, silicon doped with boron, silicon doped with phosphorus, silicon doped with arsenic, and silicon doped with gallium.

In an exemplary embodiment, resonator 210, cantilever 310, membrane 410, and suspended beam 510 includes conductive material. In a particular embodiment, the conductive material is selected from the group consisting of amorphous carbon, indium tin oxide (ITO), aluminum zinc oxide (AZO), and indium cadmium oxide.

In an exemplary embodiment, resonator 210, cantilever 310, membrane 410, and suspended beam 510 includes metal. In a particular embodiment, the metal is selected from the group consisting of gold, silver, platinum, aluminum, titanium, chromium, titanium nitride, and copper.

Materials for Probe

In an exemplary embodiment, probe 212 includes glass. In a particular embodiment, the glass is selected from the group consisting of amorphous silicon nitride, amorphous silicon dioxide, amorphous aluminum oxide, and amorphous zinc oxide.

In an exemplary embodiment, probe 212 includes plastic. In a particular embodiment, the plastic is selected from the group consisting of polyesters, polyethylene, polyvinyl chloride, polypropylene, polyacrylics, polycellulosics, polycarbonates, polystyrenes, polyamides, polyacetonitriles, polymethlamethacrylate, polyxylylenes, cellulose acetate butyrate, glycol modified polyethylene terphthalate, and styrene butadiene copolymer.

In an exemplary embodiment, probe 212 includes insulating material. In a particular embodiment, the insulating material is selected from the group consisting of silicon nitride, silicon dioxide, diamond, and aluminum oxide.

In an exemplary embodiment, probe 212 includes semiconductor material. In a particular embodiment, the semiconductor material is selected from the group consisting of silicon, silicon doped with boron, silicon doped with phosphorus, silicon doped with arsenic, silicon doped with gallium, gallium arsenide, doped diamond, amorphous carbon, zinc oxide, and indium gallium zinc oxide.

In an exemplary embodiment, probe 212 includes conductive material. In a particular embodiment, the conductive material is selected from the group consisting of amorphous carbon, indium tin oxide (ITO), aluminum zinc oxide (AZO), and indium cadmium oxide.

In an exemplary embodiment, probe 212 includes metal. In a particular embodiment, the metal is selected from the group consisting of gold, silver, platinum, aluminum, titanium, chromium, titanium nitride, and copper.

In an exemplary embodiment, probe 212 includes at least one multiwalled nanotube. In an exemplary embodiment, probe 212 includes at least one single walled nanotube.

Measurement Configurations

Optical Beam Deflection

Figure 6:
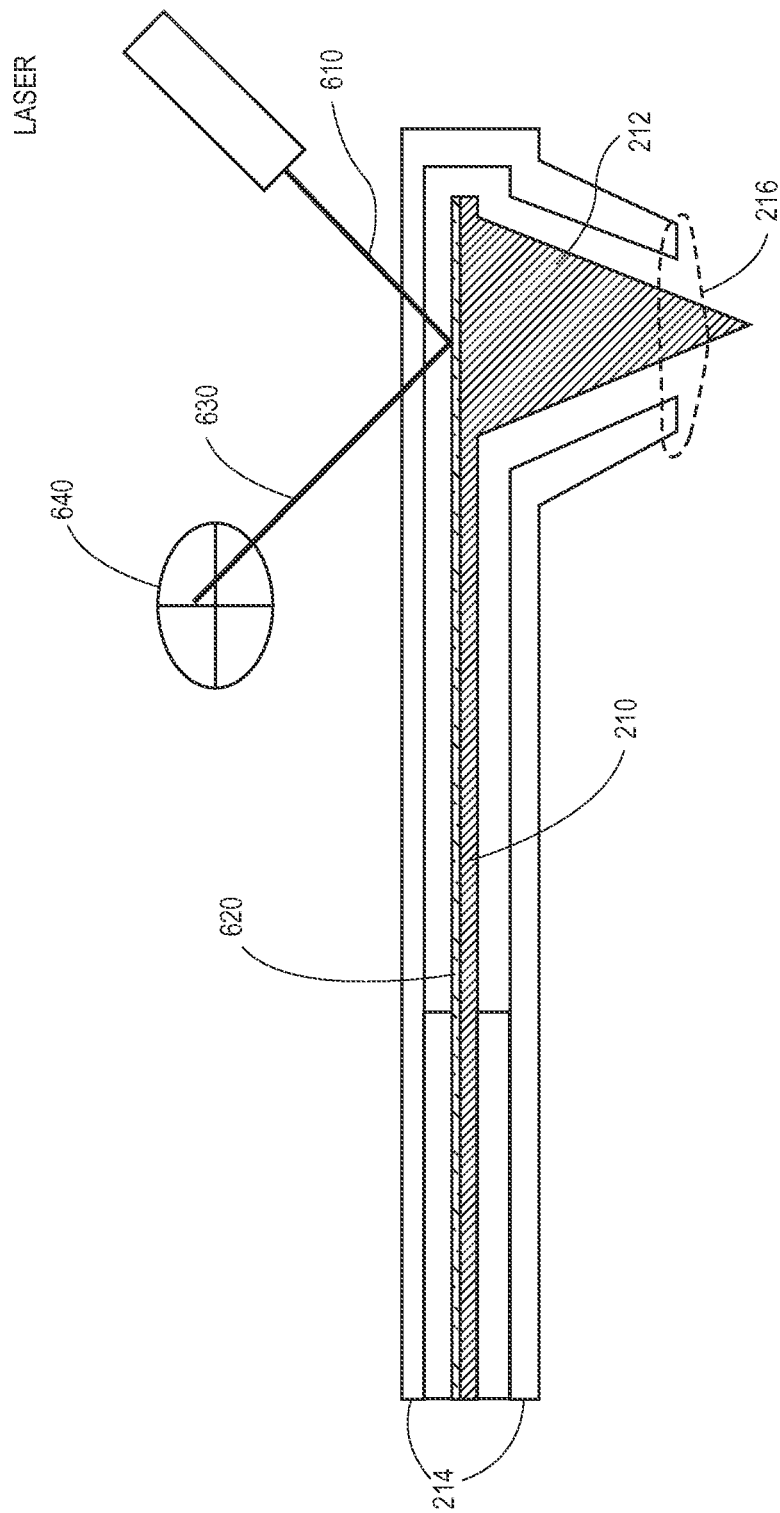
FIG. 6 shows an example of a cross-sectional illustration of a sensor configured for optical beam deflection measurement of the position of a resonator.

Referring to FIG. 6, in an exemplary embodiment, resonator 210, probe 212, and encasement 214 are configured to enable an optical beam deflection measurement of the position of resonator 210. In an exemplary embodiment, light 610 is reflected from the back side 620 of resonator 210 and the position of the reflected light 630 is detected on a position sensitive detector 640. The position of the reflected light 630 is used to determine the position of resonator 210. In a particular embodiment, position sensitive detector 640 includes a segmented photodiode.

Interferometric

Figure 7:
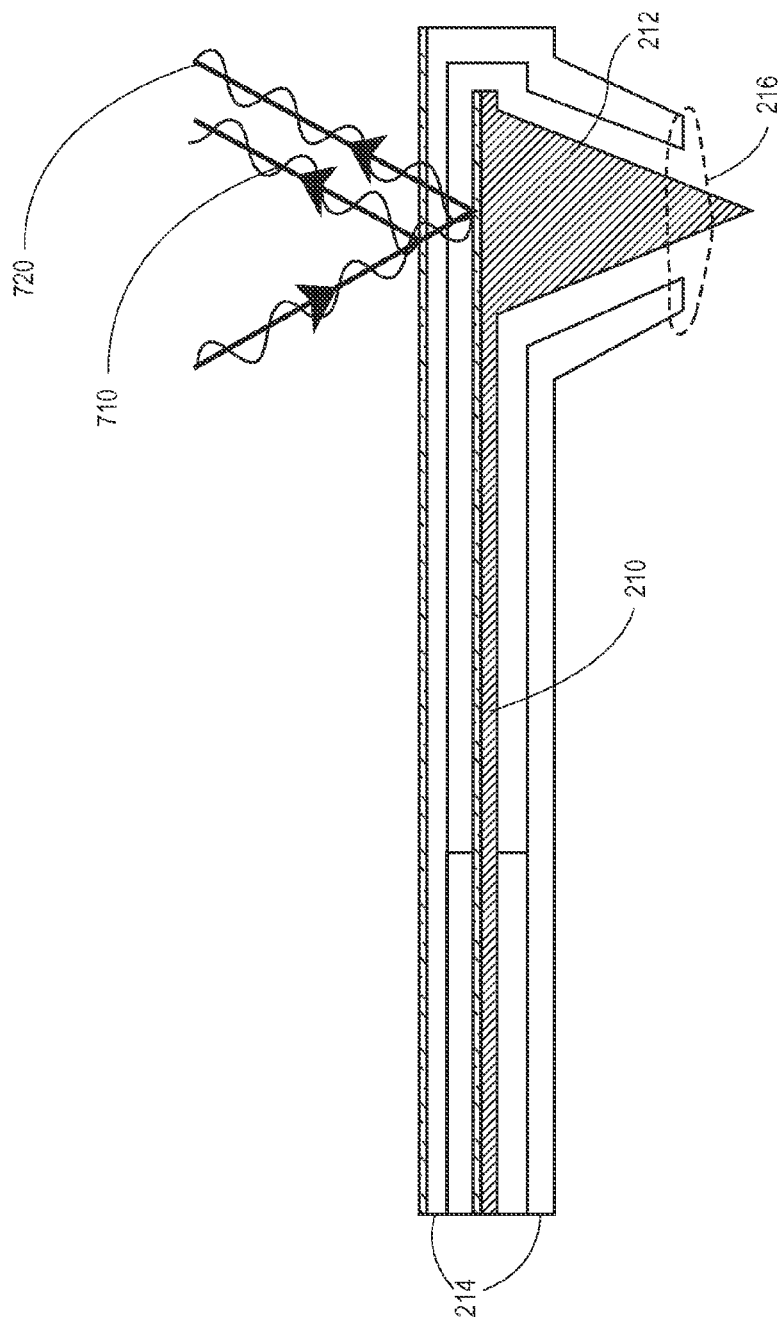
FIG. 7 shows an example of a cross-sectional illustration of a sensor configured for interferometric measurement of the position of a resonator.

Referring to FIG. 7, in an exemplary embodiment, resonator 210, probe 212, and encasement 214 are configured to enable an interferometric measurement of the position of resonator 210. In an exemplary embodiment, light 710 partially reflected from encasement 214 interferes with light 720 reflected from resonator 210. A deflection of resonator 210 modifies the difference in path length of the two beams, giving a different resulting intensity of the slim of the reflected beams that is used to determine the position of resonator 210.

Optical Beam Diffraction

Figure 8:
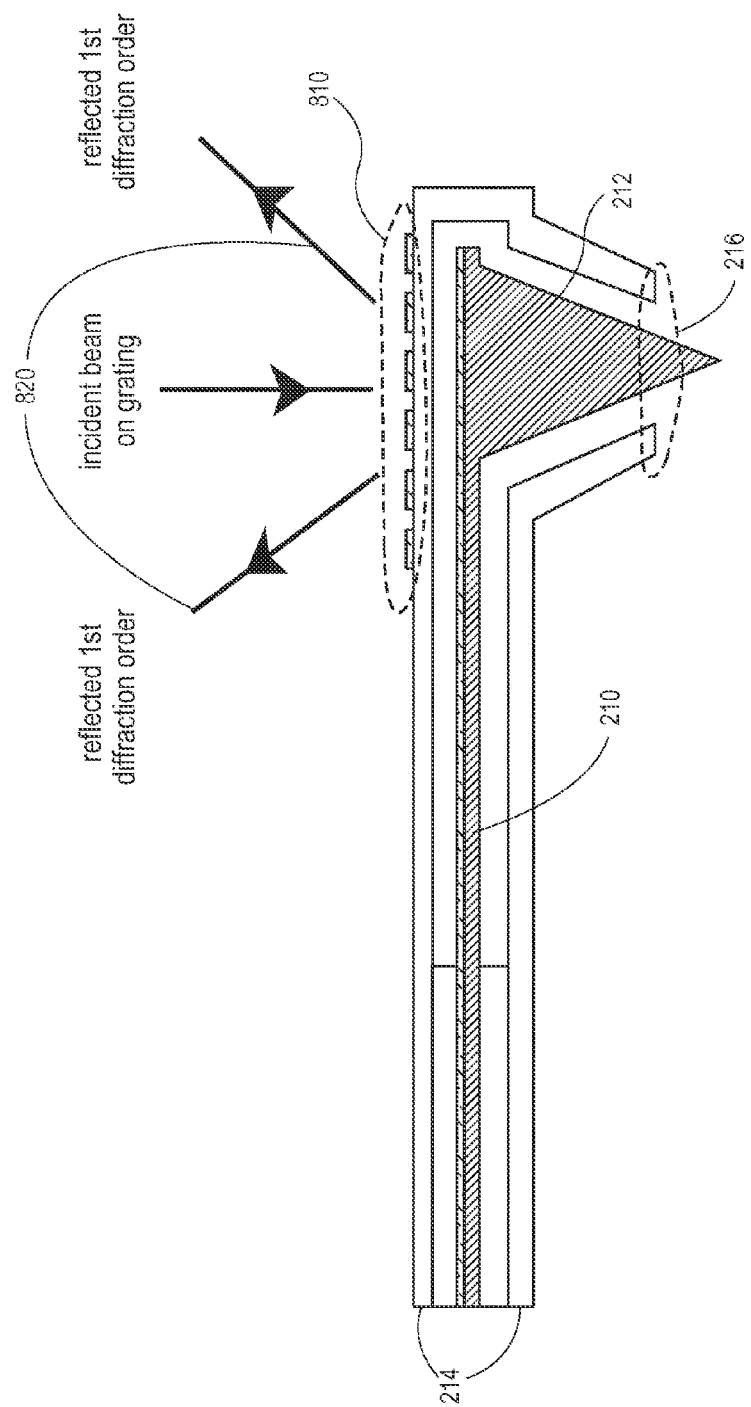
FIG. 8 shows an example of a cross-sectional illustration of a sensor configured for optical beam diffraction measurement of the position of a resonator.

Referring to FIG. 8, in an exemplary embodiment, resonator 210, probe 212, and encasement 214 are configured to enable an optical beam diffraction measurement of the position of resonator 210. In an exemplary embodiment, a grating 810 attached to encasement 214 enables optical diffraction based detection of the position of resonator 210. The position of resonator 210 is determined based on the intensity of the reflected first diffraction order 820.

Capacitive

Figure 9:
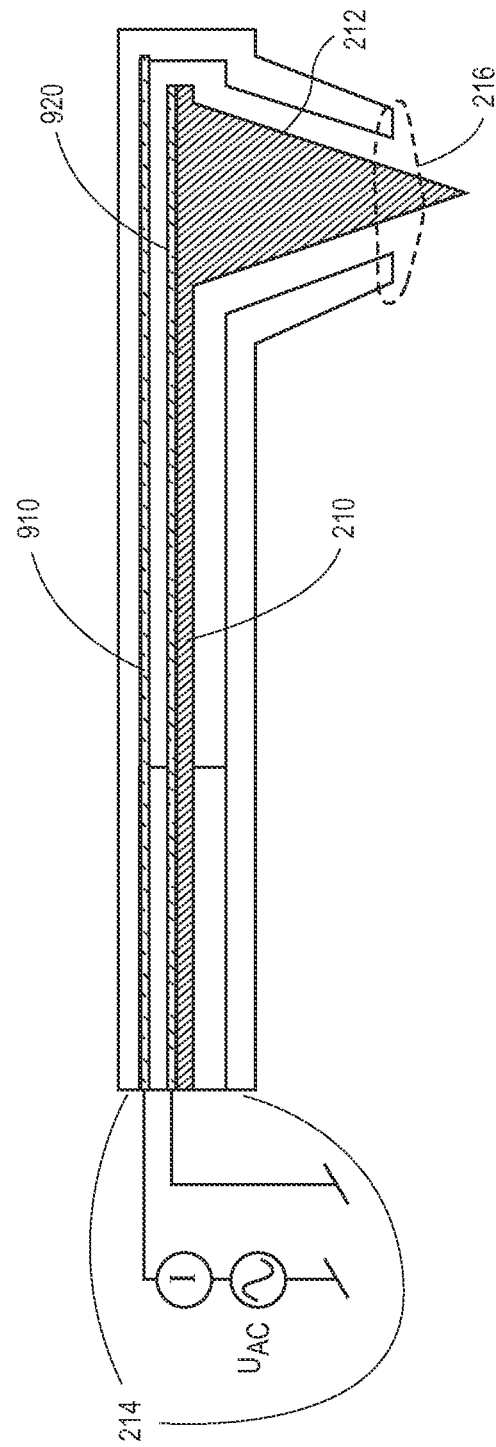
FIG. 9 shows an example of a cross-sectional illustration of a sensor configured for capacitive measurement of the position of a resonator.

Referring to FIG. 9, in an exemplary embodiment, resonator 210, probe 212, and encasement 214 are configured to enable a capacitive measurement of the position of resonator 210. In an exemplary embodiment, the capacitance is measured between a conductive layer 910 on encasement 214 and a conductive layer 920 on resonator 210 and is used to determine the position of resonator 210.

Piezoelectric

Figure 10:
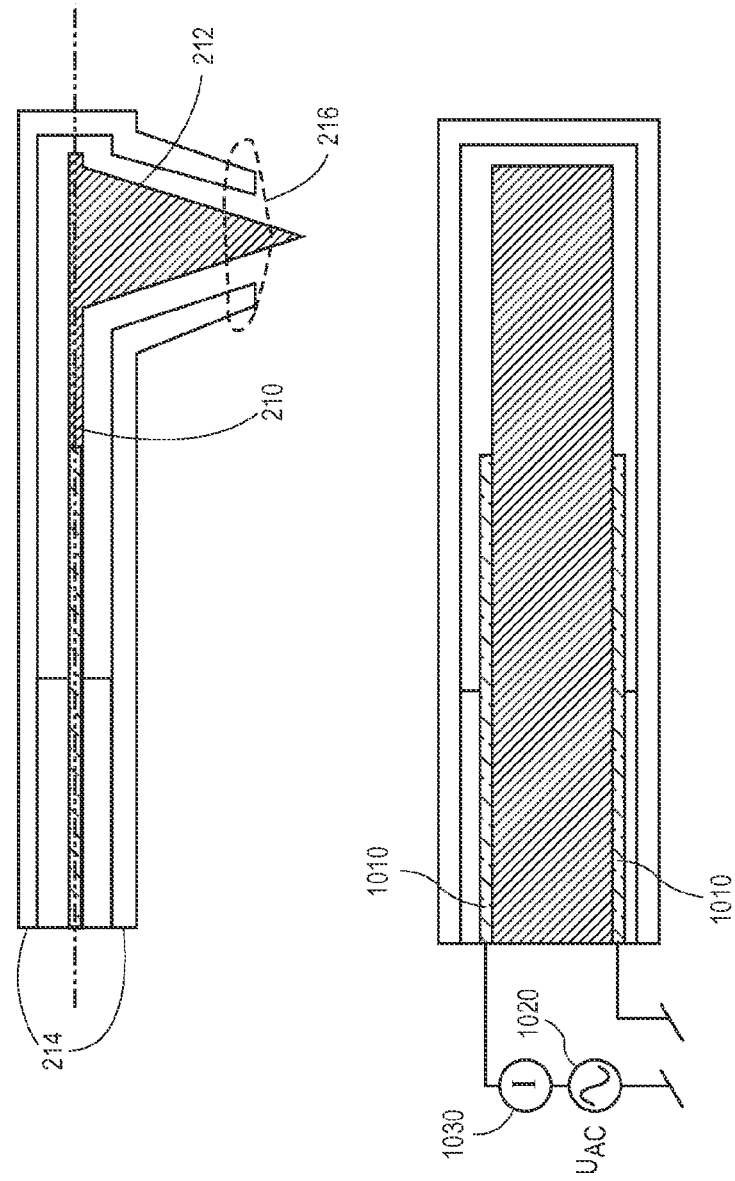
FIG. 10 shows examples of illustrations of a sensor configured for piezoelectric measurement of the position of a resonator.

Referring to FIG. 10, in an exemplary embodiment, resonator 210, probe 212, and encasement 214 are configured to enable a piezoelectric measurement of the position of resonator 210. In an exemplary embodiment, two electrodes 1010 are placed on the sides of resonator 210, which consists of a piezoelectric material. While a sinusoidal drive signal (UAC) 1020 is applied to electrodes 1010, the motion of resonator 210 can be detected on the resulting current (I) 1030. The lower drawing in FIG. 10 is a cross-section along the dotted line on the above drawing.

Piezoresistive

Figure 11:
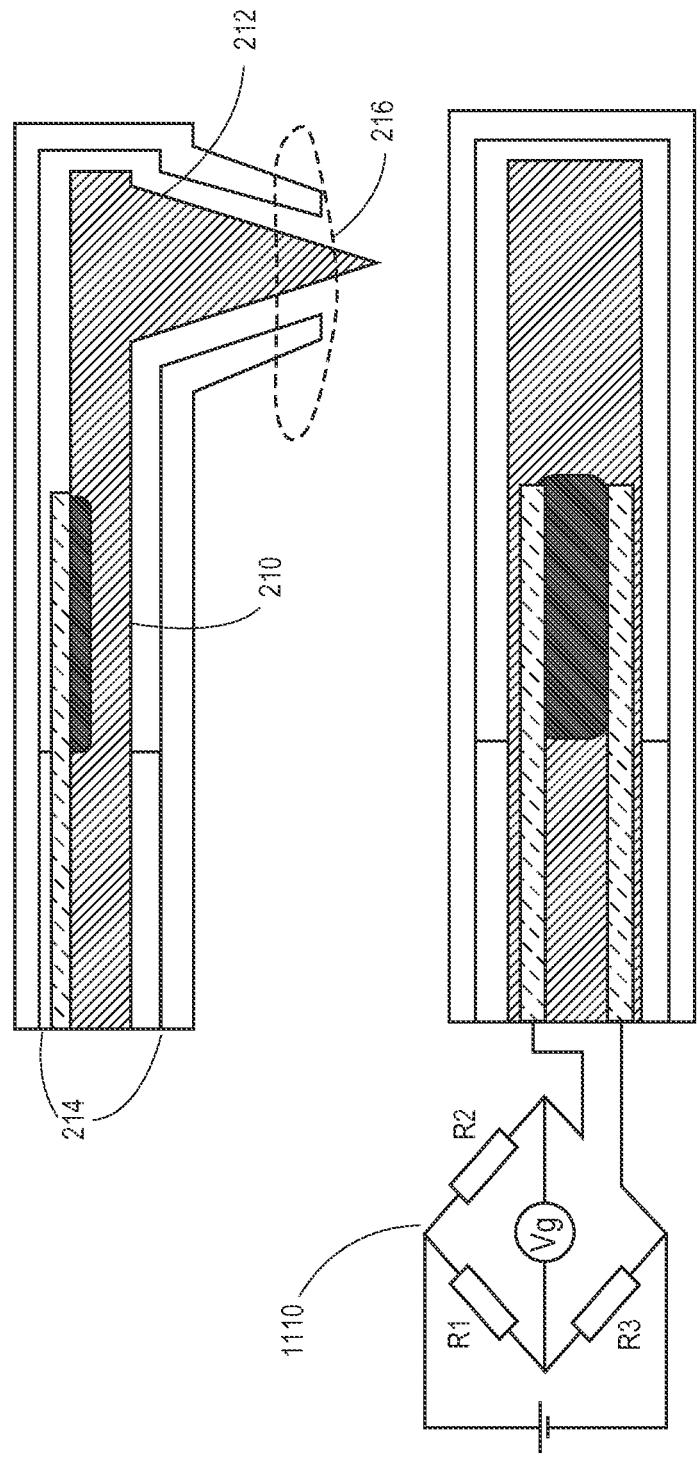
FIG. 11 shows examples of illustrations of a sensor configured for piezoresistive measurement of the position of a resonator.

Referring to FIG. 11, in an exemplary embodiment, resonator 210, probe 212, and encasement 214 are configured to enable a piezoresistive measurement of the position of resonator 210. In an exemplary embodiment, a change in resistivity of strain sensitive material (e.g., doped silicon) is measured. In an exemplary embodiment, the change is measured using a Wheatstone bridge 1110. The change in the resistivity of a strain sensitive material is used to determine the position of the resonator 210.

Fabrication Method

A simple, mask-less, fabrication technique may be used to fabricate sensors as described herein. A commercially available AFM cantilever may be used for the cantilever. In some embodiments, a cantilever is entirely coated with a sacrificial layer. This sacrificial layer defines the gap between the between the encasement and the cantilever/resonator. A second transparent layer is deposited on the sacrificial layer to build up the encasement. Then, after opening a small orifice in the encasement close to the probe, the sacrificial layer is selectively removed, exposing the probe and the cantilever/resonator.

For example, silicon dioxide that functions as a sacrificial layer may be deposited on a silicon cantilever using a plasma enhanced chemical vapor deposition (PECVD) process to uniformly coat the silicon cantilever. Silicon nitride may be deposited on the silicon dioxide to uniformly coat the silicon dioxide. A focused ion beam (FIB) may be used to cut a small opening close to the cantilever's tip. A portion of the sacrificial silicon dioxide layer is released by vapor etching using hydrofluoric acid, exposing a resonator portion of the cantilever. In some embodiments, a hydrophobic coating may be applied to the probe to aid in preventing water from entering into the opening.

CONCLUSION

The embodiments described herein provide an encasement directly around regular cantilevers. Further, a transparent encasement allows using the probes on some commercially available AFM without further modification of the instrument.

It is to be understood that the above description and examples are intended to be illustrative and not restrictive. Many embodiments will be apparent to those of skill in the art upon reading the above description and examples. The scope of the embodiments described herein should, therefore, be determined not with reference to the above description and examples, but should instead be determined with reference to the appended claims, along with the full scope of equivalents to which such claims are entitled.

What is claimed is:

1. A sensor comprising:
   a mechanical resonator;
   a probe attached to the mechanical resonator; and
   an encasement encasing the mechanical resonator, the encasement defining an opening through which the probe protrudes, the dimensions of the encasement being on the same order as dimensions of the resonator, wherein a gap is formed between the encasement and the mechanical resonator, and wherein the gap is configured to contain a fluid to provide decrease damping of the resonator.

2. The sensor of claim 1, wherein the mechanical resonator has a component selected from a group consisting of a cantilever, a membrane, and a suspended beam.

3. The sensor of claim 1, wherein the mechanical resonator comprises a cantilever, wherein a thickness of the cantilever is between about 10 nanometers and 20 microns, wherein a width of the cantilever is between about 10 nanometers and 200 microns, and wherein a length of the cantilever is between about 10 nanometers and 500 microns.

4. The sensor of claim 1, wherein mechanical the resonator comprises a cantilever, wherein a thickness of the encasement is between about 10 nanometers and 20 microns, wherein a width of the encasement is between about 10 nanometers and 250 microns, and wherein a length of the encasement is between about 10 nanometers and 550 microns.

5. The sensor of claim 1, wherein the mechanical resonator comprises a membrane, and wherein a thickness of the membrane is between about 10 nanometers and 20 microns.

6. The sensor of claim 1, wherein the mechanical resonator comprises a membrane, and wherein the membrane has a shape selected from a group consisting of a circular shape, a regular polygon shape, and a polygon shape.

7. The sensor of claim 1, wherein the mechanical resonator comprises a membrane, and wherein a thickness of the encasement is between about 100 nanometers and 20 microns.

8. The sensor of claim 1, wherein the mechanical resonator comprises a suspended beam, wherein a thickness of the suspended beam is between about 100 nanometers and 20 microns, wherein a width of the suspended beam is between about 100 nanometers and 200 microns, and wherein a length of the suspended beam is between about 100 nanometers and 500 microns.

9. The sensor of claim 1, wherein the mechanical resonator comprises a suspended beam, wherein a thickness of the encasement is between about 100 nanometers and 20 microns, wherein a width of the encasement is between about 100 nanometers and 250 microns, and wherein a length of the encasement is between about 100 nanometers and 550 microns.

10. The sensor of claim 1, wherein the encasement comprises a material selected from a group consisting of glass, plastic, insulating material, semiconductor material, conductive material, and metal.

11. The sensor of claim 1, wherein the encasement comprises plastic.

12. The sensor of claim 1, wherein the encasement comprises insulating material.

13. The sensor of claim 1, wherein the mechanical resonator comprises a material selected from a group consisting of glass, plastic, insulating material, semiconductor material, piezoelectric material, piezoresistive material, conductive material, and metal.

14. The sensor of claim 1, wherein the mechanical resonator comprises a semiconductor material.

15. The sensor of claim 1, wherein the mechanical resonator comprises one of a piezoelectric material or a piezoresistive material.

16. The sensor of claim 1, wherein the mechanical resonator comprises one of an insulating material or a plastic material.

17. The sensor of claim 1, wherein the probe comprises a material selected from a group consisting of glass, plastic, insulating material, semiconductor material, conductive material, and metal.

18. The sensor of claim 1, wherein the probe comprises a multiwalled nanotube or a single walled nanotube.

19. The sensor of claim 1, wherein the mechanical resonator, the probe, and the encasement are configured to enable a measurement of a position of the resonator.

20. The sensor of claim 19, wherein the measurement is selected from a group consisting of an optical beam deflection measurement, an interferometric measurement, an optical beam diffraction measurement, a capacitive measurement, a piezoelectric measurement, and a piezoresistive measurement.

21. The sensor of claim 1, wherein the fluid is a gas.

22. The sensor of claim 1, wherein the encasement and the opening are configured to prevent an external liquid from entering the gap.

23. The sensor of claim 1, wherein the gap is less than 500 microns.

* * * * *